United States Patent [19]
Seidler

[11] Patent Number: 5,476,181
[45] Date of Patent: Dec. 19, 1995

[54] CHILD-RESISTANT PRODUCT DISPENSER

[76] Inventor: David Seidler, 69-10 108th St., Forest Hills, N.Y. 11375

[21] Appl. No.: 213,877

[22] Filed: Mar. 15, 1994

[51] Int. Cl.⁶ .......................... B65D 55/02; B65D 83/04
[52] U.S. Cl. .......................... 215/223; 206/536; 215/208; 215/211; 222/522; 222/553
[58] Field of Search ............................ 222/541, 549, 222/553, 522, 498; 215/206, 223, 208, 211, 214, 220, 221; 206/536, 540; 221/306

[56] References Cited

U.S. PATENT DOCUMENTS

| | | |
|---|---|---|
| 2,877,918 | 3/1959 | Gardner .......................... 222/522 |
| 2,889,081 | 6/1959 | Spencer .......................... 222/553 X |
| 3,305,145 | 2/1967 | Tebbutt .......................... 222/522 |
| 3,678,884 | 7/1972 | Robbins .......................... 206/536 X |
| 3,703,975 | 11/1972 | Wittemer . |
| 3,881,639 | 5/1975 | Herip . |
| 3,913,769 | 10/1975 | Scrocco et al. . |
| 3,935,963 | 2/1976 | Knize . |
| 4,154,354 | 5/1979 | Ryder . |
| 4,413,742 | 11/1983 | Sandhaus . |
| 4,462,501 | 7/1984 | Franchi . |
| 4,464,316 | 8/1984 | Michaels . |
| 4,533,058 | 8/1985 | Uhlig . |
| 4,784,288 | 11/1988 | Jennings .......................... 206/536 X |
| 4,787,526 | 11/1988 | Pehr . |
| 4,807,768 | 2/1989 | Gach . |
| 4,821,896 | 4/1989 | Cheng . |
| 4,838,441 | 6/1989 | Chernack . |
| 4,893,728 | 1/1990 | Jennings et al. .......................... 221/306 |
| 4,971,203 | 11/1990 | Weinstein .......................... 206/536 |
| 5,040,691 | 8/1991 | Hayes et al. . |
| 5,141,129 | 8/1992 | Jennings .......................... 206/536 X |
| 5,143,234 | 9/1992 | Lohrman et al. . |
| 5,205,424 | 4/1993 | Gaspar . |
| 5,228,583 | 7/1993 | Weinstein .......................... 215/220 |

Primary Examiner—Bryon P. Gehman
Attorney, Agent, or Firm—Stroock & Stroock & Lavan

[57] ABSTRACT

A child-resistant product dispenser includes a container having an open neck. A cap having an opening is rotatably supported by the neck of the container in closed and locked condition. One of the neck and cap includes at least a first trackway and the other of the neck and cap includes at least a first projection sized to be received in and travel in the trackway. In its closed and locked position the cap can be manually rotated around the neck of the bottle. Upon a predetermined orientation of the cap with respect to the neck, the projection is aligned with the trackway permitting the cap to be axially displaced with respect to the container to permit the container contents to be removed through the opening in the cap.

25 Claims, 11 Drawing Sheets

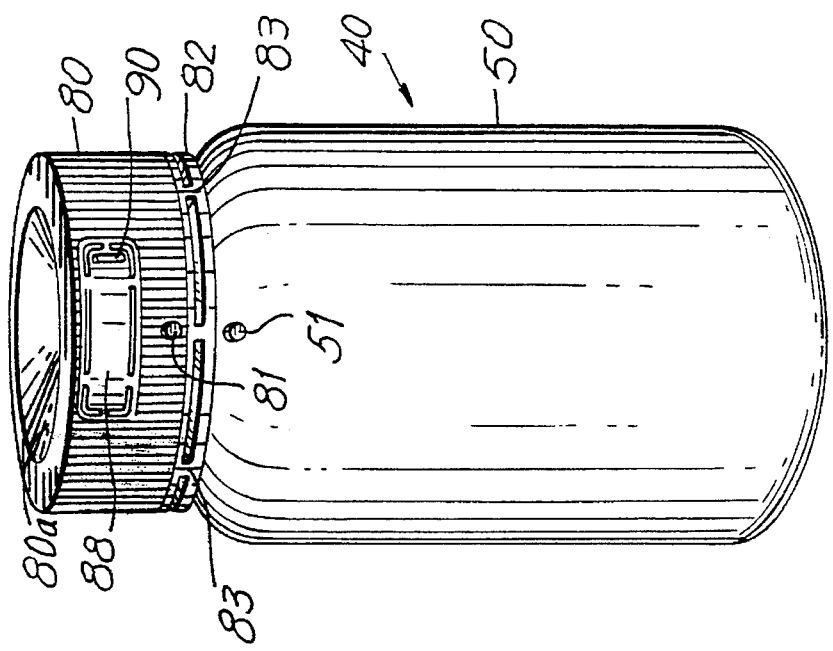
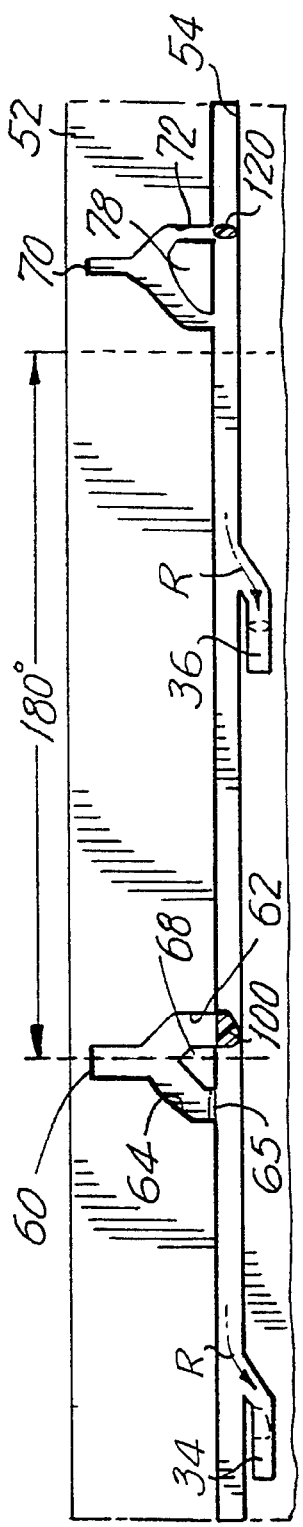

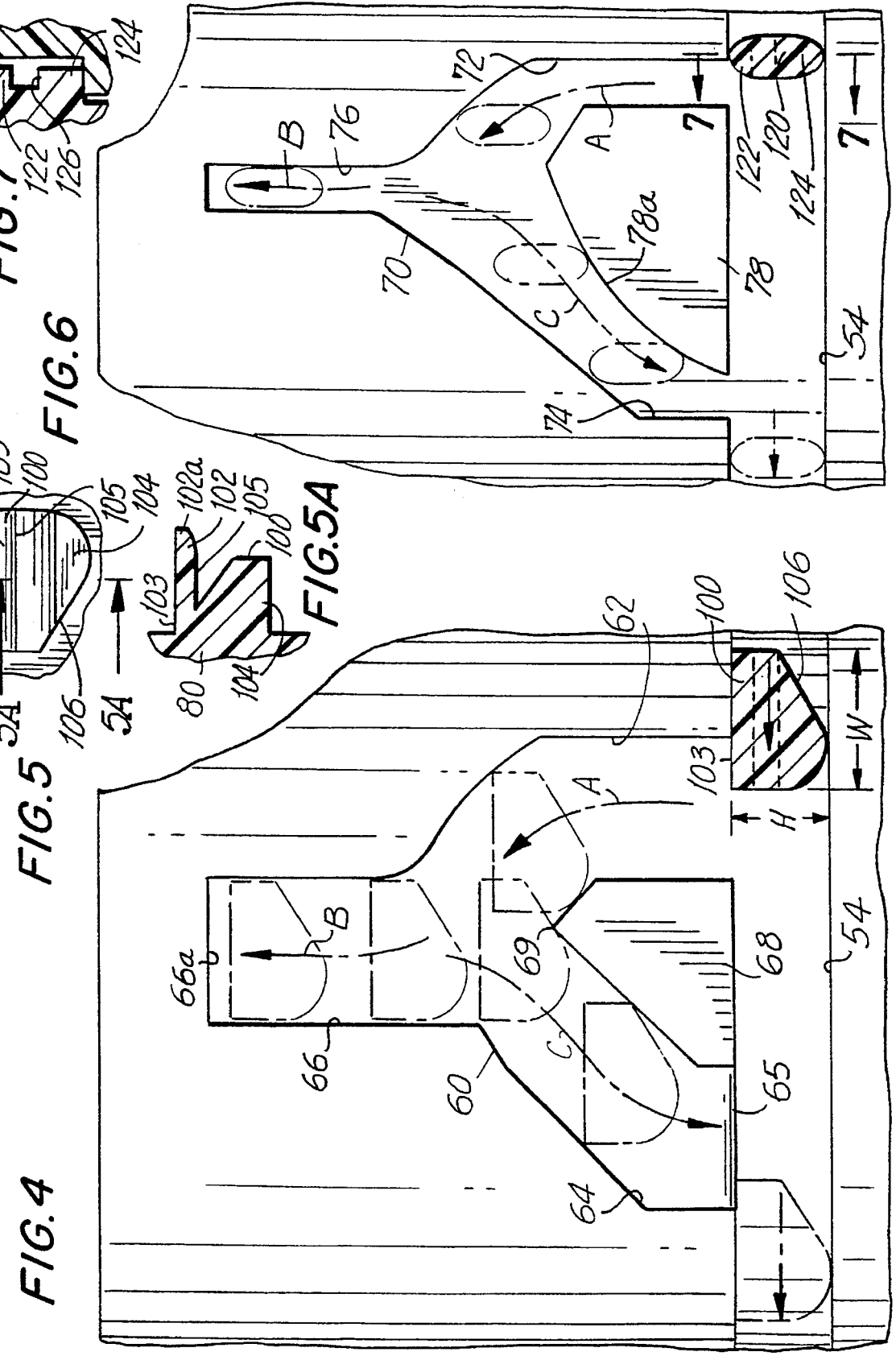

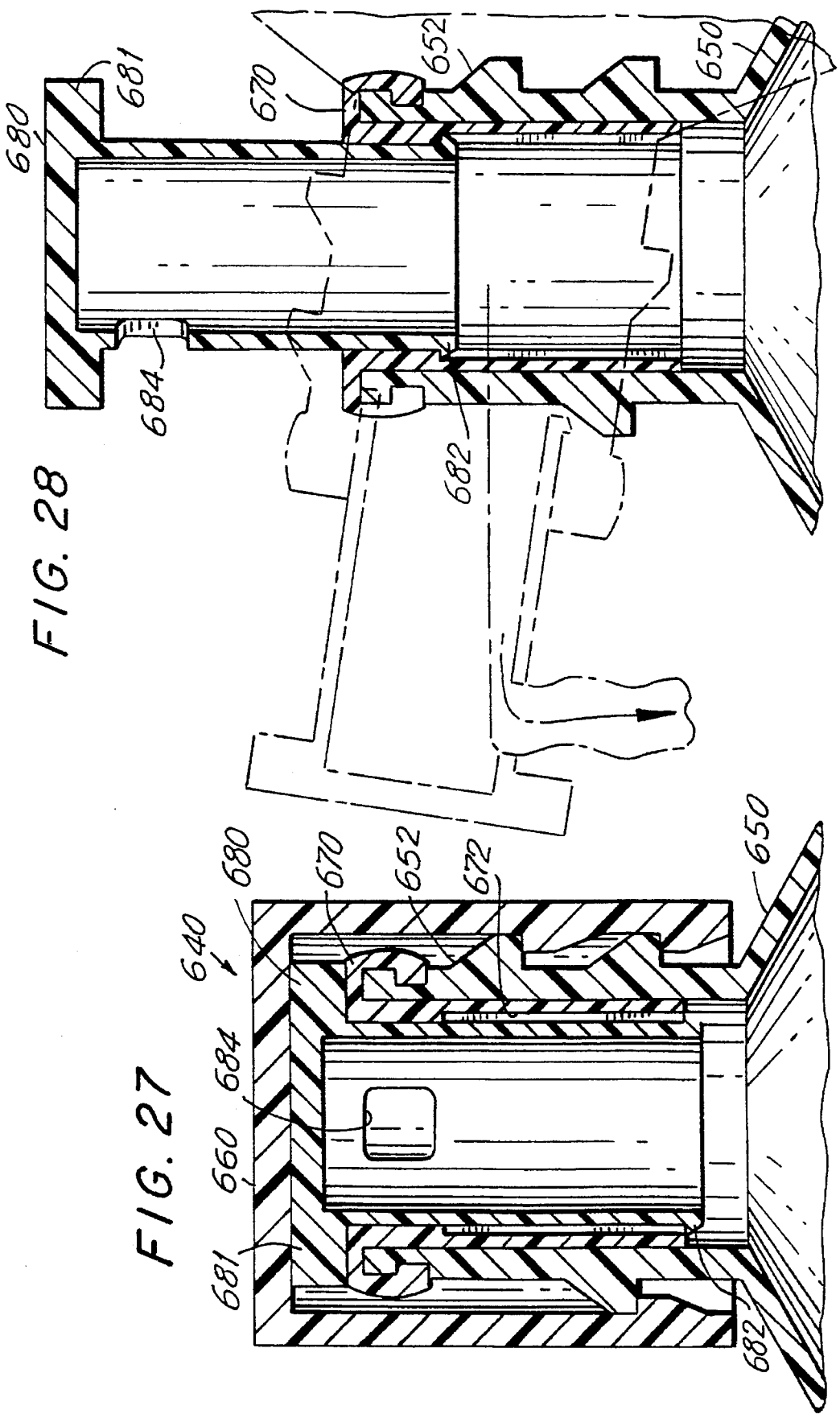

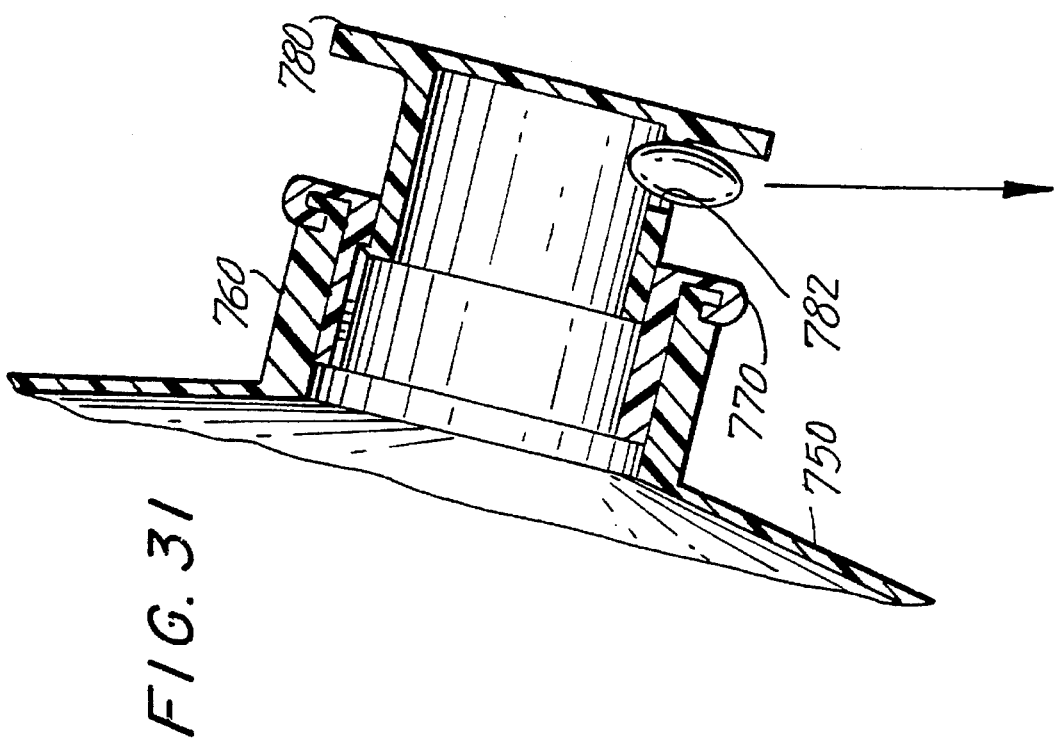
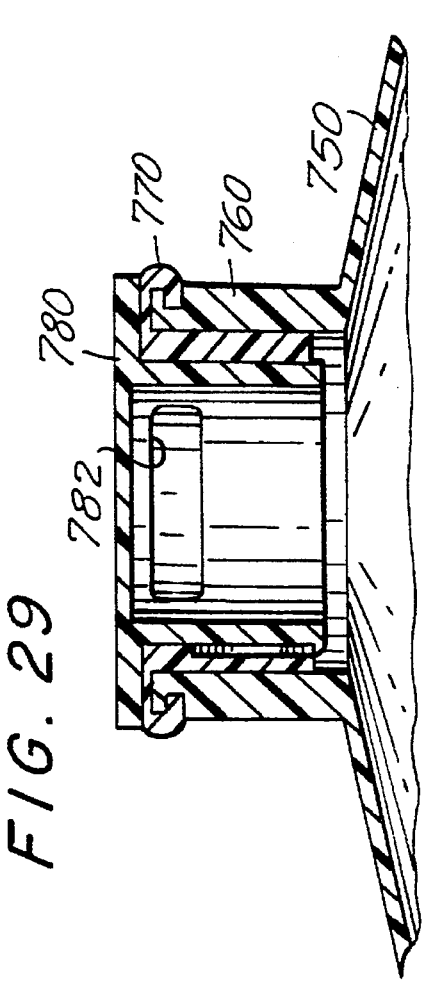
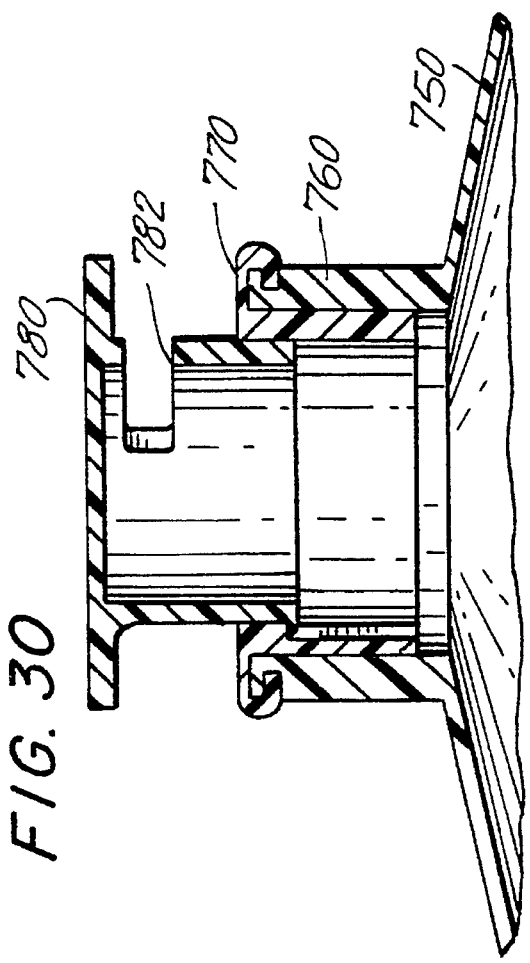

CHILD-RESISTANT PRODUCT DISPENSER

BACKGROUND OF THE INVENTION

The present invention is directed generally to a child-resistant product dispenser and, in particular, to a container adaptable for use in connection with pills, capsules, tablets or liquid which includes a rotatable cap which can be opened only in a predetermined orientation and which may provide automatic relocking into the child-resistant mode upon closure.

The need for child-resistant product containers such as bottles containing medicines in liquid or pill form is well-known and accepted. Over the years, various constructions have been developed and marketed which provide child-resistant properties. Such containers are designed to make it most difficult for young children to open the containers thereby preventing the possibility of poisoning.

One such device commonly used on aspirin bottles or other such medicine containers includes a threaded cap which requires both downward pressure and simultaneous turning to permit unthreading of the cap. In another well-known design, the sides of the cap must be squeezed inwardly during turning thereof to permit unthreading.

In another known construction, a snap-on cap is rotatably supported on the top of a bottle, and can only be removed through excess upward force when the cap is oriented in a special position with respect to the container.

Unfortunately, in all of the prior art constructions described above, the child-resistant attributes of the configuration make it difficult even for adults to open, and most often make it impossible for the elderly or those with arthritis or other manipulative diseases to open the prior art child-resistant containers.

It would be most desirable to provide a product dispenser which is child-resistant, in that it proves most difficult for a child to open, while at the same time permitting others to open the container, and which may also provide automatic locking into a child-resistant mode on closing. The present inventor has developed such a child-resistant product dispenser.

SUMMARY OF THE INVENTION

Generally speaking, in accordance with the present invention, a child-resistant product dispenser including a container having an open neck portion is provided. A cap having an opening is rotatably supported by the neck portion of the container in closed and locked condition. One of the neck and cap includes at least a first trackway and the other of the neck and cap includes at least a first projection sized to be received in and travel in the trackway. In its closed and locked position, the cap can be manually rotated around the neck of the bottle. Upon a predetermined orientation of the cap with respect to the neck (indicated by corresponding indicators on the bottle and cap), the projection is aligned with the trackway permitting the cap to be axially displaced with respect to the container to permit the container contents to be removed through the opening in the cap.

In a preferred embodiment, when the cap is axially displaced in the opposite direction, a special configuration of the trackway and projection directs the projection to cause relocking of the cap in a child-resistant mode. A second projection and second corresponding trackway may also be provided to prevent inadvertent removal of the cap from the container as it is moved to its open position.

Accordingly, it is an object of the present invention to provide an improved child-resistant product dispenser.

Another object of the present invention is to provide a product dispenser which is child-resistant, but which is easy for adults and those with manipulative disabilities to open and close.

A further object of the present invention is to provide a child-resistant product dispenser which can be used with either pills or liquid.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a front elevational view of a child-resistant product dispenser constructed in accordance with a preferred embodiment of the present invention;

FIG. 2 is a developed view of the neck portion of the container in FIG. 1 showing the two trackways and corresponding projections;

FIG. 4 is an enlarged elevational side view showing movement of the first projection in its corresponding trackway;

FIG. 5 is a rear plan view of the projection depicted in FIG. 4;

FIG. 5A is a sectional view taken along line 5A—5A of FIG. 5;

FIG. 6 is a view similar to FIG. 4 but showing movement of the second projection in the second trackway;

FIG. 7 is a sectional view taken along line 7—7 of FIG. 6;

FIG. 27 depicts an alternative embodiment of the present invention which can be used for liquid or tablet dispensing;

FIG. 28 depicts the construction of the FIG. 27 with the outer cap removed and the inner cap moved to its upper dispensing position; and FIGS. 29 through 31 are sectional views depicting yet another embodiment of the present invention.

DETAILED DESCRIPTION OF THE PREFERRED EMBODIMENTS

Figure 3:
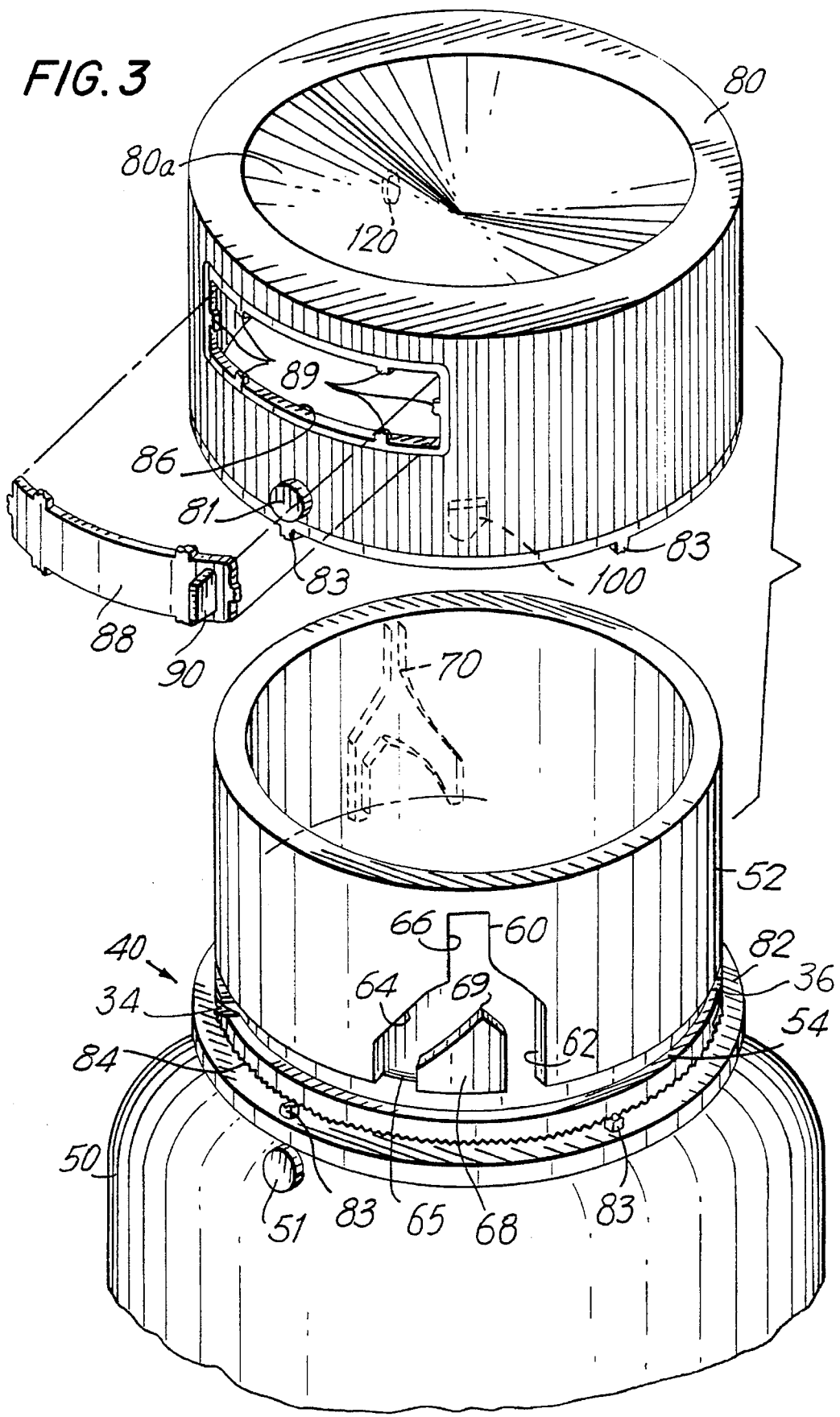
FIG. 3 is an enlarged exploded partial perspective view of the upper portion of the product dispenser depicted in FIG. 1.

Reference is first made to FIGS. 1 through 3 of the drawings which depict a product dispenser, generally indicated at 40, and constructed in accordance with a preferred embodiment of the present invention. Product dispenser 40 includes a container or bottle 50 and a cap or top 80 which is operatively secured on an open neck 52 of bottle 50 as will be fully described hereinafter.

It is noted that product dispenser 40 may include several tamper resistant or tamper evident features which provide security to a purchaser that the contents of the product dispenser have not been tampered with or otherwise adulterated. In this regard, cap 80 includes a collar 82 which is initially secured to cap 80 by a plurality of tear away tab sections 83. Collar 82 includes internal serrations 84 which mate with corresponding serrations on neck 52 to prevent rotation thereof. Hence, a purchaser may feel secure that there has been no product tampering if tabs 83 are intact when the product dispenser is purchased. After purchase, cap 80 can be rotated with respect to container 50 in order to sever or tear tabs 83 permitting further rotation of cap 80 with respect to neck 52 of bottle 50.

Cap 80 includes an opening 86 which may be closed off initially by a cover 88 having a handle 90. Cover 88 is secured to close off opening 86 by means of a plurality of tear away tabs 89. After purchase, a user can grasp handle 90 and tear off cover 88 thereby exposing opening 86. However, until the container is opened as described below in detail, opening 86 will be blocked by neck 52 to prevent removal of the contents of the container.

Referring now additionally to FIGS. 4 through 7, it is seen that bottle neck 52 includes trackways or guideways 60 and 70 formed on the outer surface thereof. Trackways 60 and 70 are preferably formed on the outer surface of bottle neck 52 at a position more than 180° apart as best depicted in FIG. 2, and both are basically inverted Y-shaped or wishbone-shaped as depicted. Trackways 60 and 70 are specially configured to cooperate with corresponding projections or pins 100 and 120, respectively, formed on the inner surface of cap 80. Bottle neck 52 also includes an annular guideway or channel 54 in which projections 100 and 120 are normally positioned and ride as cap 80 is rotated around neck 52 in its lower, locked and closed position. In this lower, closed position, the dispenser is in a child-resistant mode.

It is noted that the trackways, guideways and projections could be reversed or provided in other configurations. For example, the projections could be formed on the neck and the trackways on the cap, or the trackways could be raised and corresponding depressions provided on the other member. It is also noted that additional projections and trackways could be provided, if desired or needed, to further stabilize the cap.

Recessed trackway 60 includes a first or entrance track leg 62, a second or exit track leg 64 and an upper branch track leg 66. An island 68 is positioned intermediate entrance leg 62 and exit leg 64 to separate same. Island 68 is formed to define an upper camming peak or surface 69.

As best depicted in FIGS. 4, 5 and 5A, projection 100 is shaped as depicted and includes an upper section 102 having an essentially flat top surface 103, and a lower section 104 spaced from upper section 102 by a gap 105. It is noted that upper section 102 of projection 100 is narrower and slightly longer than lower section 104 as best depicted in FIG. 5A. Projection 100 also includes an inclined camming surface 106. It is also noted that the height H of projection 100 corresponds essentially to the height H of annular guideway 54. Preferably, as described below, projection 100 is slightly higher than guideway 54 to provide the requite biasing of cap 80 against neck 52. The width W of projection 100 corresponds essentially to the width of entrance leg 62 of first trackway 60.

Second trackway 70 also includes an entrance track leg 72, an exit track leg 74 and an upper branch track leg 76. An island 78 separates entrance track leg 72 from exit track leg 74. Second projection 120 is shaped as depicted and includes an upper section 122 and a lower section 124 separated by a gap 126. While second projection 120 preferably has essentially the same height as first projection 100, it is narrower in width to correspond to the narrow widths of the track legs of second trackway 70.

The bottle and cap are preferably manufactured separately from plastic materials. The bottle is filled with the desired product such as tablets, pills, capsules or liquid (as further described below), and then the cap is placed on and secured to the bottle neck in accordance with known plastic manufacturing techniques.

The product dispenser will be purchased by a consumer in the form depicted in FIG. 1 either boxed or unboxed. After confirming that the tamper resistant and evident seals have not been broken, cover 88 is removed by grasping and pulling handle 90 to tear the tabs. Cap 80 is grasped and rotated with respect to bottle 50 to sever tabs 83 permitting further and free manual rotation of cap 80 with respect to bottle 50. Because projections 100 and 120 on the inside of cap 80 ride in annular guideway 54, cap 80 will remain in its lower, closed position as depicted in FIG. 1 with opening 86 closed off by neck 52. Bottle 50 may include an indicia mark 51 and cap 80 may include an indicia mark 81. When cap 80 is rotated so that indicia mark 81 is aligned with indicia mark 51, first projection 100 will be positioned under and aligned with entrance track leg 62 of trackway 60, and second projection 120 will be positioned below and aligned with entrance track leg 72 of second trackway 70. This orientation of the projections with respect to the corresponding trackways is depicted in the developed view of FIG. 2.

As so positioned, cap 80 can now be pulled upwardly in an axial or longitudinal direction causing first projection 100 to enter entrance track leg 62, and second projection 120 to enter entrance track leg 72 in the direction of corresponding arrows A depicted in FIGS. 4 and 6. As cap 80 continues to be pulled upwardly, projection 100 will be directed into common branch 66 of the first trackway 60, and second projection 120 will be directed into common branch 76 of the second trackway 70 as shown by corresponding arrows B. In its second or uppermost position, upper surface 103 of projection 100 abuts against top edge 66a of branch 66, and the corresponding upper surface of projection 120 abuts against the top edge of branch 76 to prevent further upward movement or tilting of the cap and to prevent cap 80 from being removed from the container. At this time, opening 86 of cap 80 is raised above neck 52 thereby permitting the contents of bottle 50 to be poured or otherwise expelled through opening 86.

In order to close the container after cap 80 has been raised to its second position, cap 80 is pressed downwardly. As it is so pressed, projection 100 will move downwardly in the direction of arrow C. Projection 100 and island 68 are designed (as best depicted in FIG. 4) so that the inclined camming ramp 106 of projection 100 will contact camming peak 69 of island 68 thereby directing projection 100 into exit track 64 and thereafter into annular guideway 54. A ledge 65 is formed at the bottom of exit ramp 64. Tip end 102a of upper portion 102 of projection 100 will click or lock under ledge 65 as projection 100 is moved into guideway 54 thereby providing an automatic relocking feature (to the child-resistant mode) to the present invention since cap 80 cannot be moved axially upwardly again until rotated into the predetermined orientation where the indicia are aligned.

Second projection 120 will follow a similar path in its exit ramp 74 in the direction of arrow C as best depicted in FIG. 6, being directed along sloping surface 78a of island 78 until it returns to annular guideway 54. The width of the second trackway is purposefully made narrower than the first trackway so that the first projection will not fit therein. Accordingly, there is only one angular orientation of the cap with respect to the bottle which will permit upward axial displacement.

Figure 13:
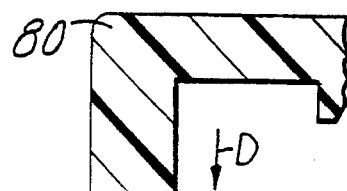
FIGS. 13 through 16 are sectional views of the container neck and cap which depict relative movement of the cap with respect to the neck of the bottle in accordance with the present invention.
Figure 14:
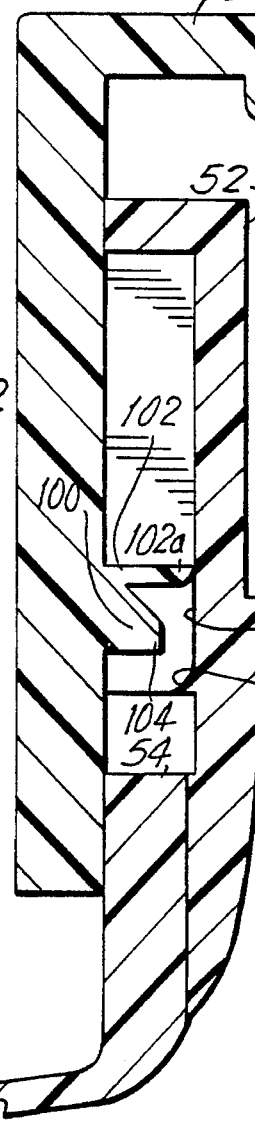
Figure 15:
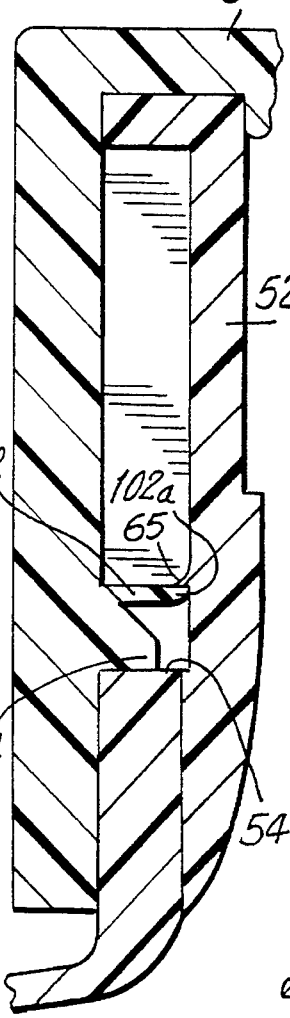
Figure 16:
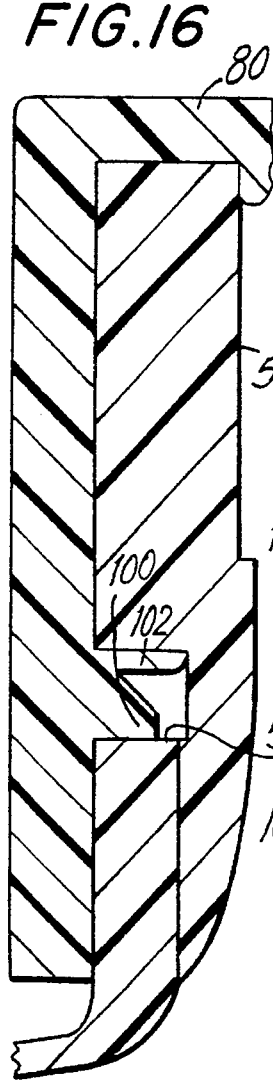

Referring now to FIGS. 13 through 16, the action of projection 100 in trackway 60 as cap 80 is moved from its second or upper position to its third or closed position will be described. FIG. 13 depicts cap 80 in its uppermost position where button projection 100 is in upper branch 66 and top surface 103 of upper section 102 of projection 100 rests against the top edge 66a of branch trackway 66. As cap 80 is pushed downwardly in the direction of arrow D, FIG. 14 shows projection 100 being moved downwardly into exit leg 64 and approaching annular guideway 54. FIG. 15 shows projection 100 having been pushed below exit leg 64 into annular guideway 54 and whereafter tip end 102a of the upper portion of projection 100 has snapped and locked under ledge 65 to prevent reopening in that orientation. FIG. 16 shows further rotation of cap 80 with respect to bottle neck 52 wherein projection 100 has been rotated away from passageway 60 and lies completely within annular guideway 54.

Figure 8:
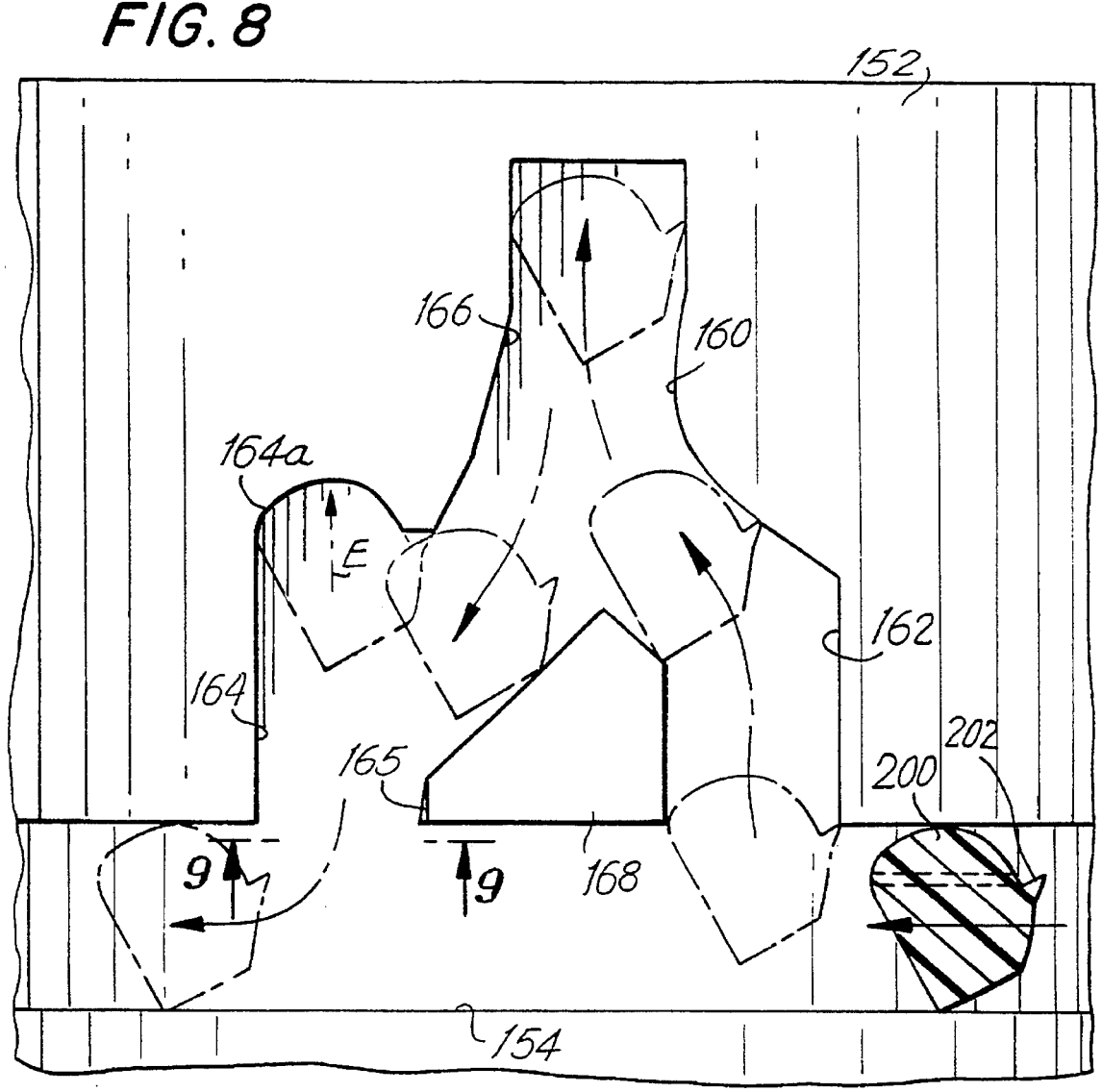
FIG. 8 is a view similar to FIG. 4 but showing a first alternative embodiment of a projection and corresponding trackway for use in the present invention.
Figure 9:
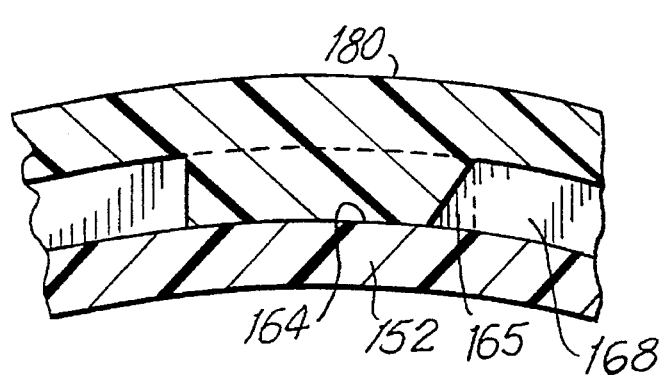
FIG. 9 is an enlarged sectional view taken along line 9—9 of FIG. 8.
Figure 10:
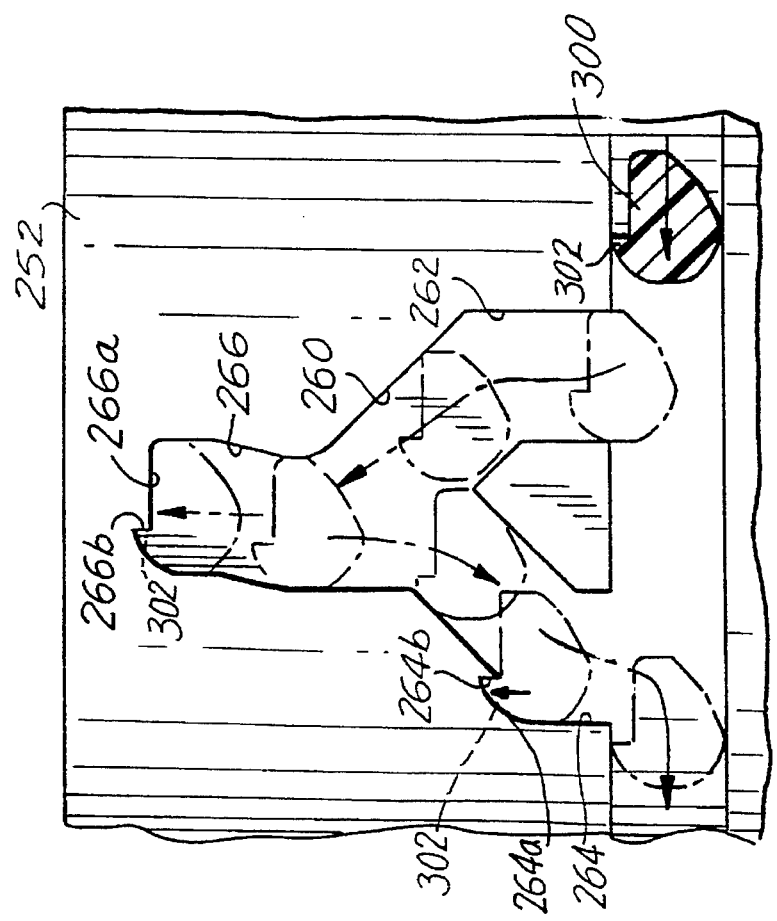
FIG. 10 is a view similar to FIG. 4 but showing a second alternative embodiment of a projection and corresponding trackway for use in the present invention.

FIGS. 8 through 10 depict an alternative construction for the first trackway and corresponding first projection. In this alternative embodiment, neck 152 of the bottle includes a recessed passageway 160 having an entrance passageway 162, an exit passageway 164 and a common branch passageway 166. Bottle cap 180 includes a button projection 200 shaped as depicted which includes a tail 202.

Island 168 includes a ledge 165 which extends partially into the open end of exit passageway 164 adjacent annular guideway 154. As cap 180 is moved downwardly and projection 200 leaves exit passageway 164, tail 202 will snap under ledge 165 to provide the automatic locking feature of the present invention.

It is also noted that in this embodiment, upper end 164a of exit ramp 164 is shaped to receive a portion of projection 200 should cap 180 be pulled upwardly in the direction of arrow E after projection 200 has entered exit passageway 164 but before tail 202 has locked under ledge 165. This construction provides a further safety mechanism to avoid undesired reopening.

In the second alternative embodiment depicted in FIG. 10, bottle neck 252 includes a passageway 260 shaped as depicted having an entrance ramp 262, an exit ramp 264 and a branch track 266. Projection 300 on the inside surface of the bottle cap is shaped as depicted and includes an upper projection 302. The upper edge of 266a of branch track 266 is shaped like the top of projection 300 and includes a recess 266b which receives projection 302. Similarly, upper end 264a of exit ramp 264 includes a recessed portion 264b which receives projection 302 should a user attempt to reopen the product dispenser after projection 300 has entered exit ramp 264.

Figure 11:
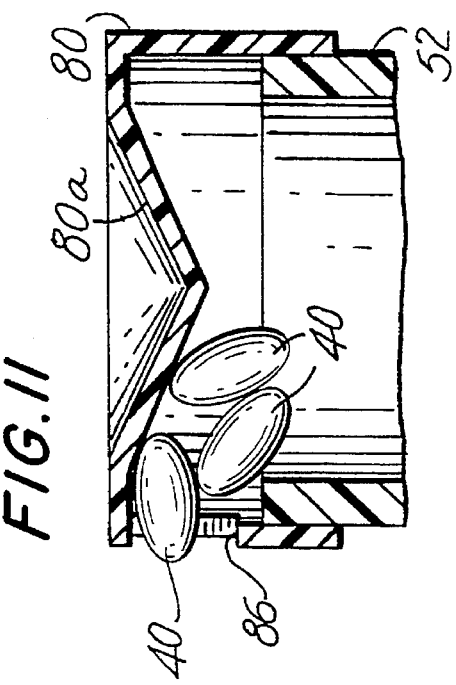
FIG. 11 is a sectional view of the upper neck portion of the container and the cap, with the cap shown in its raised position.

FIG. 11 is a sectional view showing cap 80 in its raised open position wherein opening 86 is clear for permitting the contents of the bottle to be removed therethrough. In particular, FIG. 11 depicts the conically shaped recess portion 80a of cap 80 which acts to inhibit the bridging of capsules 40 thereby permitting dispensing of one capsule at a time while preventing blockage.

Figure 12:
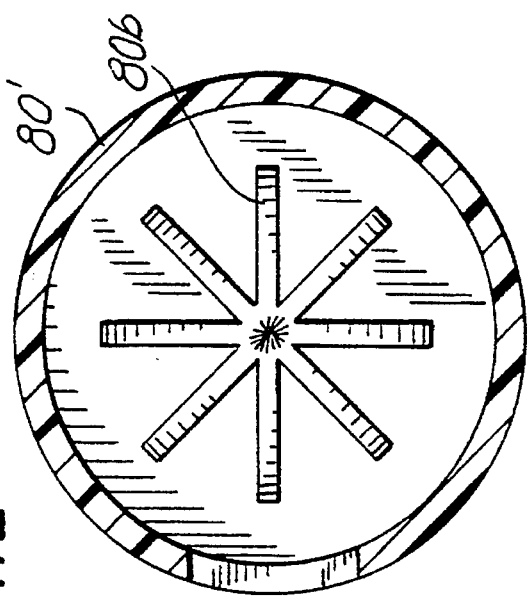
FIG. 12 is a sectional plan view of the inside surface of a cap depicting an alternative embodiment thereof.

FIG. 12 depicts an alternative embodiment for the under surface of cap 80. In FIG. 12, cap 80' includes a star shaped pattern 80b on the inner surface thereof which acts like conical surface 80a in FIG. 11 to prevent or inhibit the bridging of capsules during pouring.

In product dispensers, in general, and in dispensers which will be used to dispense pills, tablets, capsules on the one hand or liquid medication on the other hand, it is important that a moisture-vapor transmission seal (MVT) be provided. FIGS. 17 through 24 depict various alternative embodiments for providing the MVT seal in the product dispenser of the present invention.

Figure 17:
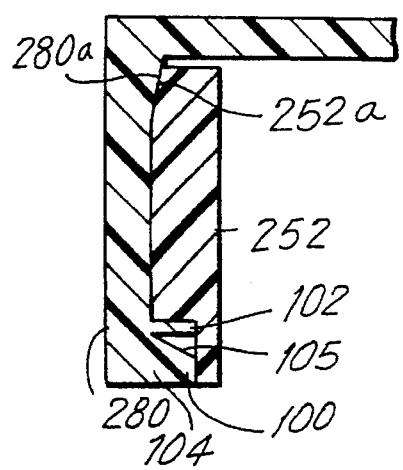
FIGS. 17 through 22 are sectional views of a container neck and cap which depict various sealing constructions for the present invention.

In FIG. 17, cap 280 includes a beveled surface 280a at the upper inside surface thereof which mates with a corresponding beveled surface 252a of slightly different taper on the upper outer surface of bottle neck 252. Gap 105 in projection 100 permits a predetermined amount of biasing between upper leg 102 and lower leg 104 of projection 100 such that a predetermined amount of downward force will be exerted when projection 100 is positioned in annular track 54.

Figure 18:
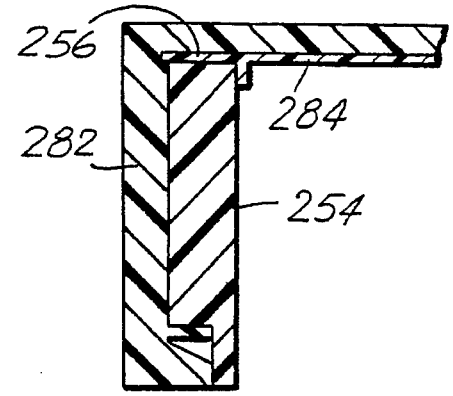

The construction depicted in FIG. 18 shows a bottle cap 282 which includes a separate seal material 284, such as plastic coated paper or the like, at the top thereof which seals against upper surface 256 of bottle neck 254 when the cap is in its closed position.

Figure 19:
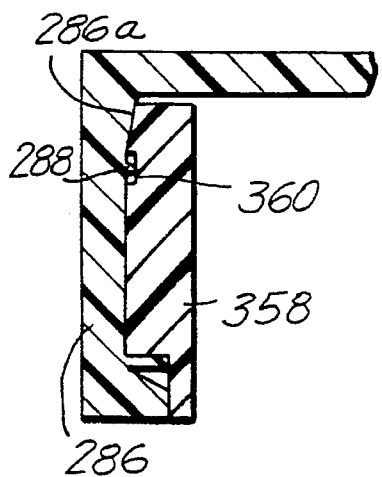

FIG. 19 depicts a construction where bottle cap 286 includes both a beveled surface 286a and a slight annular projection 288 which is received in an annular recessed portion 360 of bottle neck 358.

Figure 20:
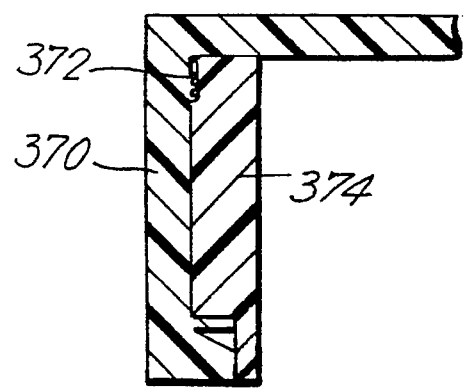

In FIG. 20, bottle cap 370 includes an irregular surface 372 which mates with a corresponding irregular surface on bottle neck 374.

Figure 21:
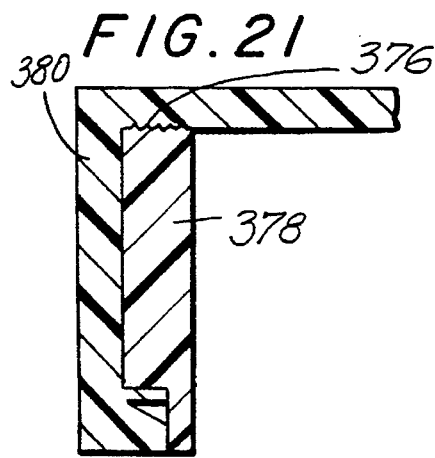

In FIG. 21, an irregular surface is formed on the upper edge 376 of bottle neck 378 which presses against the inner surface of cap 380 which may also be irregular.

Figure 22:
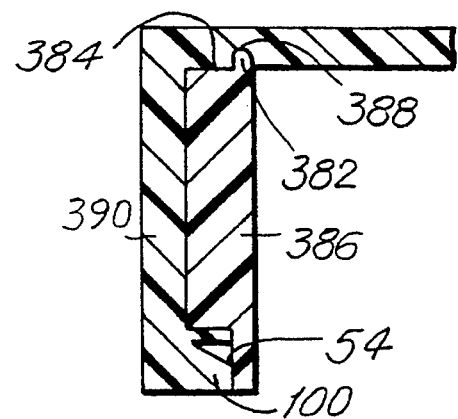

In FIG. 22, an annular projection 382 is formed on the upper edge 384 of bottle neck 386 which is received in an annular recess 388 of bottle cap 390. Again, as in all of the foregoing embodiments, projection 100 positioned in annular track 54 provides the requisite biasing force on the bottle cap to provide the mating sealing arrangement.

Figure 24:
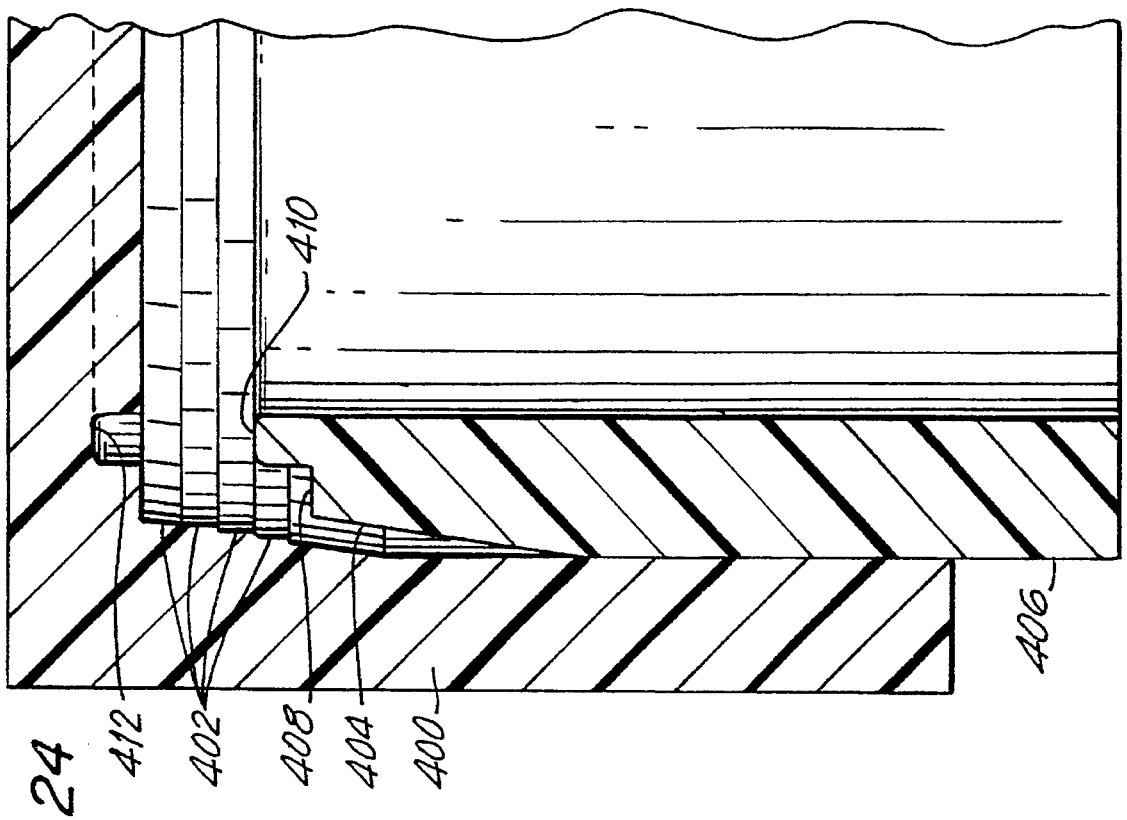
FIGS. 23 and 24 are partial sectional views of the container neck and cap depicting a preferred embodiment of the sealing system of the present invention.
Figure 23:
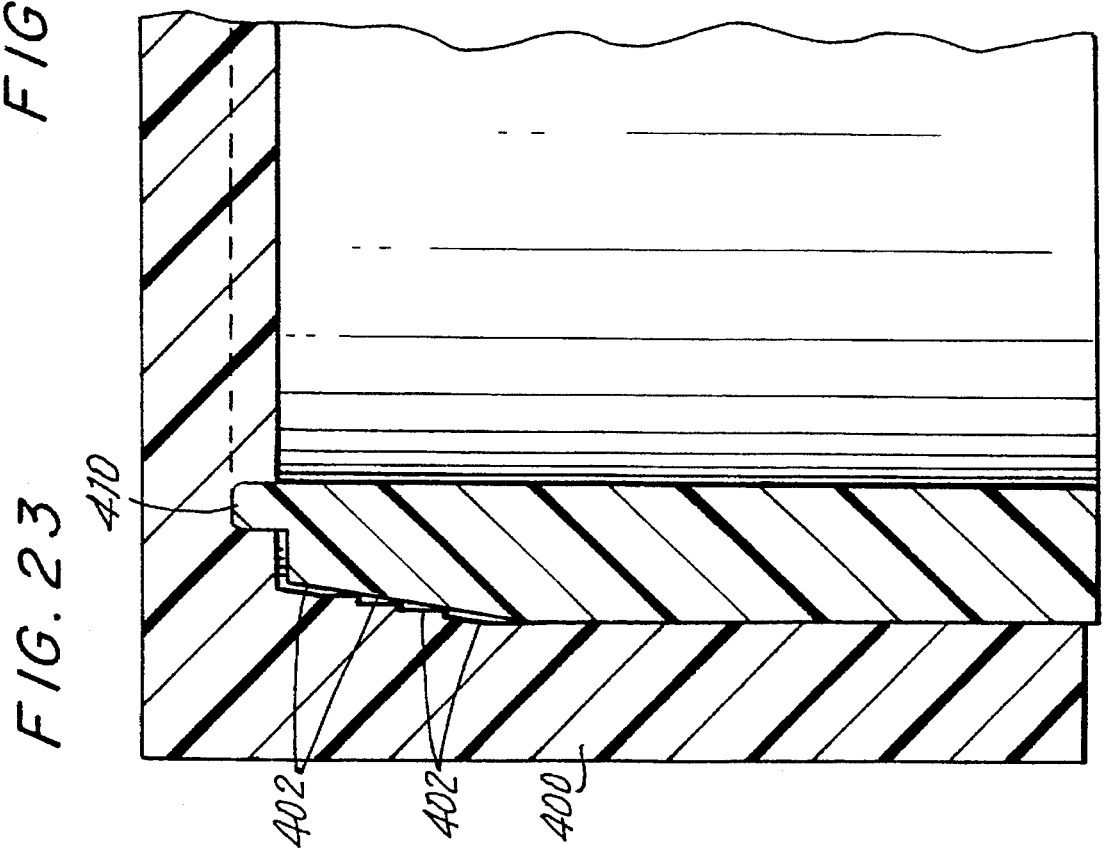

FIGS. 23 and 24 depict the preferred sealing means in which bottle cap 400 includes annular serrations 402 which mate with a beveled surface 404 on bottle neck 406. In addition, the upper free end 408 of bottle neck 406 includes an annular projection 410 which is received in a corresponding annular recess 412 formed in the under surface of bottle cap 400.

In order to provide an even tighter sealing, further downward pressure can be exerted on the cap by means of a lower projection ramp. Referring to FIGS. 2 and 3, it is seen that lower projection ramps 34 and 36 can be provided leading downwardly off of annular guideway 54, as depicted. As cap 80 is rotated and pressed downwardly, projection 100 will enter ramp 34 while projection 120 enters ramp 36 in the direction shown by arrows R. This will act to further force the inner surface of cap 80 towards the upper surface of the bottle neck to provide an even tighter MVT seal.

Figure 26:
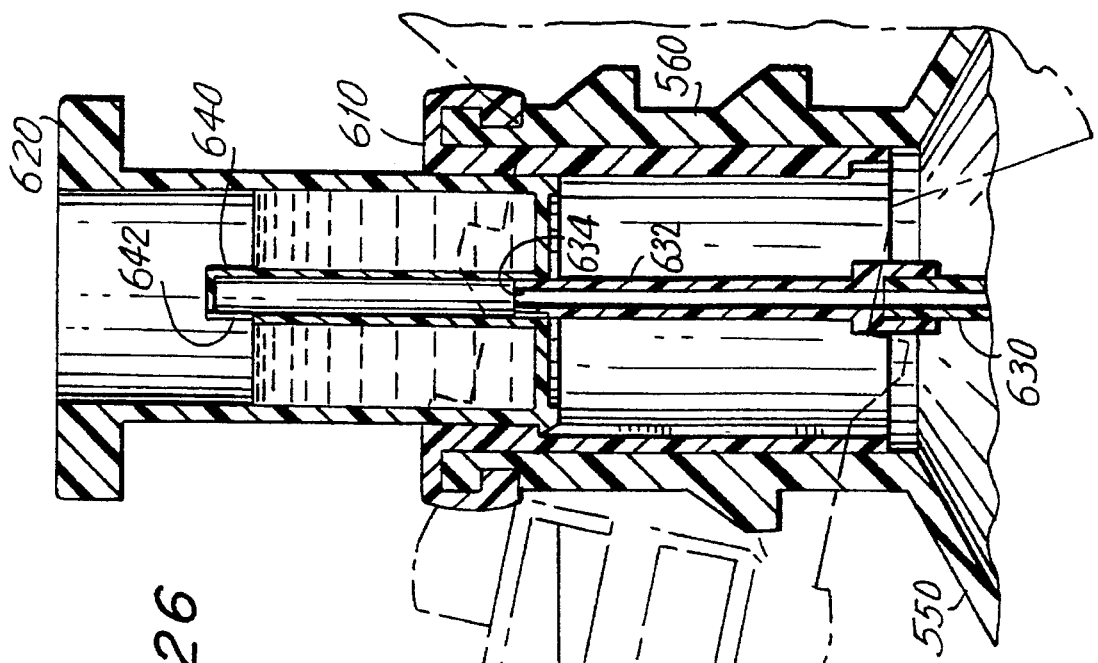
FIG. 26 shows the construction of FIG. 25 with the outer cap removed and the dosage cup moved to its upper position.
Figure 25:
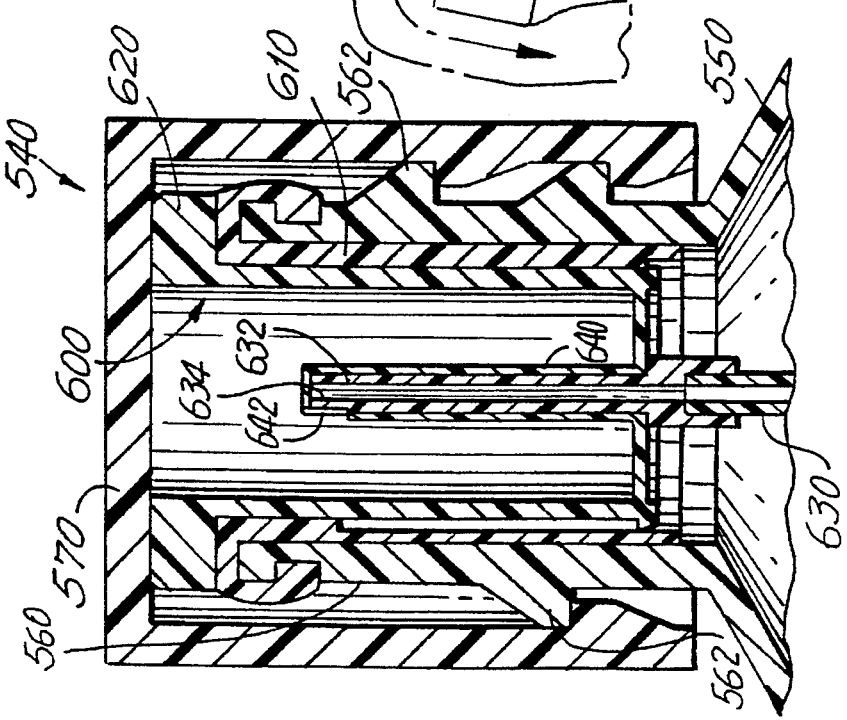
FIG. 25 is a sectional view of a container neck and cap depicting an alternative embodiment of the present invention having a construction which can be used for the dosage dispensing of liquid.

Reference is now made to FIGS. 25 and 26 which depict a construction of the present invention which may be used for the dosage dispensing of liquid medication or the like. As depicted, product dispenser 540 includes a container 550 having a neck portion 560 having threads 562 on the outer surface thereof. A threaded cap 570 is removably threaded onto bottle neck 560. An insert section generally indicated at 600 is provided within bottle neck 560.

Insert section 600 includes an outer sleeve 610 which is secured on neck 560. An inner sliding sleeve 620 is provided within outer sleeve 610. The outer surface of inner sleeve 620 includes the projections and the exposed surface of outer sleeve 610 includes the corresponding trackways and guideways such that inner sleeve 620 can be rotated with respect to outer sleeve 610, and when properly oriented as shown by appropriate indicia marks, inner sleeve 620 can be raised to the position depicted in FIG. 26.

The present construction is special in that inner sleeve 620 acts as a dosage cup. In this regard, a hollow tube 630 is supported on outer sleeve 610 and extends into product container 550. Tube 630 includes an extending portion 632 and an open free end 634. When inner sleeve or cup 620 is in its lower position as depicted in FIG. 25, an outer tube cover 640 covers tube extension 632 and closes off free end 634 of tube extension 632.

Tube cover 640 includes an opening 642 on the side thereof. When inner sleeve or cup 620 is oriented in the appropriate position with respect to outer sleeve 610, it can be raised upwardly to the position depicted in FIG. 26. Opening 642 is then exposed to the internal channel of the tubes such that when container 550 is squeezed, liquid therein will be expelled through opening 642 into dosage cup 620 which can then be filled with the appropriate liquid or medication to the desired level as depicted in FIG. 26. The medication can then be poured and swallowed as depicted in phantom in FIG. 26, whereafter the dosage cup is moved downwardly and relocked in its lower position.

FIGS. 27 and 28 depict yet another alternative embodiment of the product dispenser of the present invention useful in particular in connection with the dispensing of liquids. In this embodiment, product dispenser 640 includes a container 650 and a screw cap 660, although in this embodiment the screw cap is not required. Bottle 650 includes a neck portion 652 to which is secured an outer sleeve 670 having trackways 672 formed on the inner surface thereof in a manner similar to that described above in detail. An inner sleeve 680 is slidably rotatably supported within outer sleeve 670 and includes projections 682. Inner sleeve 680 also includes an opening 684 which is closed off and covered by outer sleeve 670 when inner sleeve 680 is in its closed lower position.

In use, cap 660 is unthreaded from neck 652. Top 681 of inner sleeve 680 can then be grasped and rotated to line up corresponding indicia where projections 682 will align with their corresponding trackways. Member 680 can then be pulled upwardly, whereafter the bottle can be turned and the contents emptied through opening 684 as depicted in phantom in FIG. 28. Pushing down on inner sleeve 680, causes reorientation, closing and locking as described above.

FIGS. 29 through 31 depict an alternative embodiment useful for the dispensing of pills wherein bottle 750 includes a neck 760 having a sleeve plug 770 secured therein. A rotatable and slidable inner cap 780 having an opening 782 is also provided.

In its lower closed position, opening 782 of cap 780 is covered and closed off by outer sleeve 770. When cap 780 is rotated to align appropriate indicia marks, cap 780 can then be grasped and pulled upwardly as shown in FIG. 30 thereby exposing opening 782. The container can then be tilted to permit pills or other contents within bottle 750 to be expelled through opening 782 as depicted in FIG. 31.

The present invention can be adopted for all use of product dispensers including but not limited to prescription medical vials and the like.

Regardless of the various described embodiments of the present invention, a first member is rotated with respect to a second member to a predetermined orientation wherein guides on one of the two members are aligned with corresponding tracks on the other of the two members to permit axial movement of one member with respect to the other thereby permitting the container to be opened. Additionally, when the cap is pressed towards a closed position, the present invention may provide an automatic reorientation of the cap with respect to the bottle such that automatic relocking occurs.

The product dispenser of the present invention can be used for pills, tablets, capsules and other solid medication as well as liquids and the like. Because of the manner in which the components must be manipulated, rotated and pulled to open the package, the package may be considered child-resistant. The package can also be initially made tamper resistant or tamper evident as described, thereby providing a most convenient, efficient and desirable child-resistant package, which at the same time will not prove difficult manipulatively for the elderly or those with arthritis, for example, to open.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A product dispenser comprising a bottle having an open neck, a cap rotatably supported by said neck, said cap having an opening therein, one of said neck and said cap including at least a first projection and the other of said neck and said cap including at least a first trackway, said cap being manually displaceable from a first closed position where said opening is covered by said neck to a second open position where said opening is uncovered when said first projection is aligned with said first trackway, said first projection riding in said first trackway as said cap is moved from its first to its second position, said first trackway being wishbone shaped and including an entrance track, an exit track and a branch track, said cap being manually displaceable from its first to its second position when said first projection is rotated to be aligned with said entrance track, said first projection riding into said entrance track as said cap is manually displaced from its first to its second position.

2. The product dispenser as claimed in claim 1, wherein said cap and said bottle include corresponding indicia means for indicating when said first projection is aligned with said entrance track.

3. The product dispenser as claimed in claim 1, wherein said branch track includes a surface contacted by said first projection when said cap is moved to its second position to prevent said cap from being removed from said bottle.

4. The product dispenser as claimed in claim 1, wherein said one of said neck and cap which includes said first trackway further includes an annular guideway in which said first projection extends and rides to define a child-resistant mode as said cap is manually rotated when in said first or third closed positions.

5. The product dispenser as claimed in claim 4, further comprising sealing means for providing an MVT seal when said dispenser is in said child-resistant mode.

6. The product dispenser as claimed in claim 5, wherein said sealing means includes corresponding beveled surfaces on the inside surface of said cap and on the outside surface of said neck.

7. The product dispenser as claimed in claim 5, wherein said sealing means includes a separate seal material inside said cap.

8. The product dispenser as claimed in claim 5, wherein said sealing means includes an irregular surface on at least one of the inside surface of said cap and the outside surface of said neck.

9. The product dispenser as claimed in claim 5, wherein said sealing means further includes a recess on at least one of the inside surface of said cap and the outside surface of said neck.

10. The product dispenser as claimed in claim 5, wherein said sealing means includes annular serrations on the inside surface of said cap, said neck including a beveled surface on the outer surface thereof which mates with said annular serrations when said dispenser is in its child-resistant mode.

11. The product dispenser as claimed in claim 5, wherein said sealing means includes at least a first lower projection ramp extending off of said annular guideway, said first projection selectively extending into said lower projection ramp to tightly lock said cap to said neck.

12. The product dispenser as claimed in claim 1, wherein said cap is manually displaceable from its second open position to a third closed position, said first projection riding into said exit track as said cap is manually displaced from its second to its third position.

13. The product dispenser as claimed in claim 12, wherein said first trackway includes a first cam intermediate said entrance track and said exit track, said first projection including a second cam which engages with said first cam as said cap is manually displaced from its second open position towards its third closed position for directing said first projection into said exit track.

14. The product dispenser as claimed in claim 13, wherein said first cam is a raised projection having a first camming surface and said second cam is a second camming surface on said first projection, said second camming surface engaging said first camming surface when said cap is displaced from its second position towards its third position to direct said first projection into said exit track.

15. The product dispenser as claimed in claim 12, wherein said exit track includes blocking means for blocking said first projection from reentering said branch track from said exit track.

16. The product dispenser as claimed in claim 12, wherein said exit track includes locking means which cooperates with said first projection for relocking said cap to said neck when said cap is moved to its third closed position.

17. The product dispenser as claimed in claim 16, wherein said locking means is a ledge, said first projection including an extension which contacts and locks under said ledge.

18. The product dispenser as claimed in claim 17, wherein said neck includes an upper edge, said first projection biasing said cap against the upper edge of said neck when said cap is in its first or third closed positions.

19. The product dispenser as claimed in claim 16, wherein said first projection includes an extension which contacts said locking means as said cap is moved from its second to its third position to relock said cap in its third closed position.

20. The product dispenser as claimed in claim 19, wherein said first projection includes a gap adjacent said extension.

21. A product dispenser comprising a bottle having an open neck, a cap rotatably supported by said neck, said cap having an opening therein, one of said neck and said cap including at least a first projection and the other of said neck and said cap including at least a first trackway, said cap being manually displaceable from a first closed position where said opening is covered by said neck to a second open position where said opening is uncovered when said first projection is aligned with said first trackway, said first projection riding in said first trackway as said cap is moved from its first to its second position, the one of said neck and said cap which includes said first trackway further including at least a second longitudinally extending trackway, the other of said neck and cap including at least a second projection which is aligned with said second trackway when said first projection is aligned with said first trackway, said second projection traveling in said second trackway when said cap is moved from its first to its second position, said first trackway including a dimension which is different than a dimension of said second trackway so that said first projection fits only in said first trackway.

22. The product dispenser as claimed in claim 21, wherein said first trackway is wider than said second trackway, said first projection being wider than said second projection.

23. A product dispenser comprising a bottle having an open neck, a cap rotatably supported by said neck, said cap having an opening therein, one of said neck and said cap including at least a first projection and the other of said neck and said cap including at least a first trackway, said cap being manually displaceable from a first closed position where said opening is covered by said neck to a second open position where said opening is uncovered when said first projection is aligned with said first trackway, said first projection riding in said first trackway as said cap is moved from its first to its second position said cap including a top inner surface, said top inner surface including bridging-inhibiting means for preventing the bridging of capsules in said bottle.

24. The product dispenser as claimed in claim 23, wherein said bridging-inhibiting means includes a conical surface on the top inner surface of said cap..

25. The product dispenser as claimed in claim 23, wherein said bridging-inhibiting means includes a star-shaped pattern on the top inner surface of said cap.

* * * * *